Patented May 30, 1944

2,350,230

UNITED STATES PATENT OFFICE 2,350,230

METHOD OF REACTING PINENE AND FORMALDEHYDE AND THE PRODUCT OBTAINED

Mortimer T. Harvey, South Orange, N. J., assignor to Harvel Research Corporation, a corporation of New Jersey No Drawing. Application December 26, 1942, Serial No. 470,225

2 Claims. (Cl. 260—631.5)

This invention relates to novel products and to methods for producing the same. More particularly, the invention is directed to novel reaction products and to the methods for producing them. In one of its specific aspects the invention is directed to the novel organic condensation products obtained by treating turpentine or pinene with formaldehyde in the presence of a catalyst whose concentration with respect to the turpentine or pinene is below a predetermined value.

Briefly, this invention in one of its more limited aspects comprises reacting pinene or turpentine with formaldehyde in the presence of water and an acid catalyst whose concentration in the aqueous phase of said mixture is less than that required to appreciably polymerize the turpentine or pinene. The specific method for carrying out this invention is to completely react one mole of pinene or an amount of turpentine containing one mole proportion of pinene with more than one mole proportion of formaldehyde in the presence of water and an amount of an acid catalyst whose concentration in the aqueous phase of said mixture is less than that required to cause appreciable polymerization of said pinene or turpentine. This method may be carried out by heating a mixture of pinene or turpentine, an aqueous solution of formaldehyde and a quantity of an acid catalyst whose concentration in the aqueous phase of the mixture is below that required to cause appreciable polymerization of said pinene or turpentine. By employing this method, I have found that the formaldehyde will react with the turpentine or pinene to such an extent that the ratio of the formaldehyde which has feacted with the turpentine or the pinene is greater than one mole of formaldehyde per mole of pinene or an amount of turpentine containing one mole proportion of pinene. I have further found that by following this method as much as and even more than three moles of formaldehyde may be completely reacted with one mole of pinene or an amount of turpentine containing one mole proportion of pinene. In the course of my experimentations, I have discovered that when said method is employed, the formaldehyde and turpentine or pinene react to produce a product which continues to react with the formaldehyde notwithstanding the presence of unreacted turpentine or pinene in the mixture. This reaction continues until more than one mole of the formaldehyde has completely reacted with one mole of pinene or an amount of turpentine containing one mole proportion of pinene, where the mole ratio of the formaldehyde to the turpentine or pinene in the mixture is greater than one and even in those cases where said mole ratio is equal to one or less than one and as small as one-half. However, it has been found preferable to employ a mixture containing the following ingredients in the following proportions: more than one mole of formaldehyde in aqueous solution and between one to seven moles of formaldehyde in aqueous solution to each mole of pinene or an amount of turpentine containing one mole proportion of pinene in the presence of less than about one mole and between .01 and .1 mole of an acid catalyst.

By following the above method, there may be produced novel condensation reaction products which are liquid and have fractions which boil above 165° C. and as high as and even higher than 300° C. These condensation products are substantially completely soluble in equal volumes of ethyl alcohol, are substantially completely insoluble in equal volumes of petroleum ether having a boiling point between 40° C. and 60° C., are capable of forming a solid rubber-like gel with a hard, solid material such as polyvinyl chloride, polyvinyl acetate or copolymers of polyvinyl chloride and polyvinyl acetate when the ratio of the former to the latter is about 5 to 1 by weight, are capable of being thickened by oxidation or blowing and are capable of tackifying or being dissolved in butadiene rubbery polymers insoluble in kerosene.

The following are given by way of illustration, and pinene may be substituted for turpentine therein, all parts being given by weight:

*Example 1.*—An amount of turpentine containing one mole of pinene to about one mole of formaldehyde.

A mixture consisting of 462 parts of turpentine, 253 parts of a 40% water solution of formaldehyde and three parts of concentrated hydrochloric acid is heated to boiling and maintained in this state of boiling for about eight hours under a reflux condenser. The resultant mass is allowed to cool to room temperature and separated into two layers which were (a) an oil-like layer which had a specific gravity of 0.926 at 75° F. and which weighed about 460 grams, (b) a water layer of about 250 parts and having a specific gravity of 1.040.

*Example 2.*—An amount of turpentine containing one mole of pinene to about two moles of formaldehyde.

A mixture consisting of 462 parts of turpentine, 510 parts of 40% formaldehyde aqueous solution, and 4.5 parts of concentrated hydrochloric acid is heated to boiling and maintained in this state of boiling under a reflux condenser for about eight hours. The resultant mass is allowed to cool to room temperature and separated into two layers which were (a) a light colored oil-like layer having a specific gravity of 0.933 and of about 500 parts and (b) a water layer having a specific gravity of 1.068 and of about 450 parts.

*Example 3.*—An amount of turpentine containing one mole of pinene to about three moles of formaldehyde.

A mixture consisting of 462 parts of turpentine, 765 parts of a 40% aqueous solution of formaldehyde and seven parts of concentrated hydrochloric acid is heated to boiling and maintained in this state of boiling under a reflux condenser for about eight hours. The resultant mass is allowed to cool to room temperature and was separated into two layers which were (a) an oil-like layer having a specific gravity of 1.30 and of about 635 parts and (b) a water layer of about 560 parts and having a specific gravity of 1.044.

*Example 4.*—An amount of turpentine containing one mole of pinene to about four moles of formaldehyde.

A mixture consisting of 80 parts of turpentine, 160 parts of a 40% solution of formaldehyde in water and 1.1 parts of concentrated sulphuric acid is heated to boiling and maintained in this state of boiling under a reflux condenser with continued stirring for about 8 hours. The resultant mass is allowed to cool and the (a) oil-like layer separated from the (b) water layer.

*Example 5.*—An amount of turpentine containing one mole of pinene to about five moles of formaldehyde.

A mixture consisting of 68 parts of turpentine, 190 parts of a 40% formaldehyde solution in water and 1.5 parts of concentrated sulphuric acid is heated to boiling and maintained in this state for about ten hours under a reflux condenser. The mass was allowed to cool to room temperature and separated into two layers, one of which is an (a) oil-like layer and the other is a (b) water layer.

The turpentine used in each of the above examples had a specific gravity of 0.865 at 75° F. and was almost colorless. It is considered in said examples to contain about 75% pinene and the calculation for molecular proportions is made with this in view.

*Turpentine*

| Temperature, degrees C. | Per cent distilled (by vol.) |
| --- | --- |
| 158 | 10 |
| 158.5 | 20 |
| 159 | 30 |
| 159.5 | 40 |
| 160 | 60 |
| 161 | 80 |
| 163 | 90 |
| 171 | 97 |

The oily-layer (a) of each of the above examples has fractions boiling at temperatures above 165° C., and at least 80% by volume of each of said oily layers (a) has fractions boiling above 165° C. and moreover at least 50% by volume of each of said oily layers (a) has fractions above 200° C. and at least 20% by volume of each of said oily layers (a) has boiling points above 250° C. The oily layers (a) of each of said examples were distilled and the portion boiling up to 175° C. was in each case removed and the residue, that is the portion boiling above 175° C., has the following properties when compared with the corresponding properties of turpentine.

| | Turpentine | Residue |
| --- | --- | --- |
| Specific gravity at 25° C. | 0.862 | Greater than 1. |
| Viscosity at 25° C. (centipoises) | 28 | Greater than 100. |
| Percent insoluble in kerosene (by vol.) (10 cc. product in 90 cc. kerosene). | 0 | More than 20%. |
| Per cent distilled between 212° C. to 300° C. | 0 | More than 50%. |

The following table is given herein to illustrate that portions of said oil-like layers (a) of each of said examples have boiling points above certain predetermined temperatures and also shows that larger quantities of said oil-like layers (a) having boiling points above certain temperatures are produced by increasing the ratio of the formaldehyde to the pinene or turpentine. For these purposes the boiling points of the oil-like layers (a) of Examples 1 and 3 are illustrative.

| Per cent distilled (by vol.) | Temperature, °C. | |
| --- | --- | --- |
| | Example 1 (a) | Example 3 (a) |
| 10 | 157 | 169 |
| 20 | 169 | 182.5 |
| 30 | 178 | 255 |
| 40 | 195 | 281 |
| 50 | 212 | 296 |
| 60 | 229 | 313 |
| 70 | 254 | 315 |
| 80 | 272 | 322 |
| 90 | 304 | 326 |

Each of said oil-like layers (a) of each of said examples are substantially completely soluble in equal volumes of ethyl alcohol, are substantially completely insoluble in equal volumes of petroleum ether having boiling points between 40° C. and 60° C. are capable of forming a solid rubber-like gel with a solid material such as polyvinyl chloride, polyvinyl acetate and copolymers of polyvinyl chloride and polyvinyl acetate when the ratio of the quantity of said oily layer to that of said solid material is about 5 to 1 by weight, are capable of being thickened by oxidation by blowing with air or oxygen and are capable of tackifying or being dissolved in butadiene rubbery polymers insoluble in kerosene.

This is a continuation in part of my copending application Serial No. 243,123, filed November 30, 1938.

I claim:

1. The method for producing a liquid organic condensation product having a fraction thereof whose boiling point is above 175° C. comprising heating a mixture comprising pinene, an aqueous solution of formaldehyde and an acid catalyst, the mole ratio of said pinene to said formaldehyde in said mixture being between about 1 to 1 and 1 to 7, the mole ratio of said pinene to said acid catalyst in said mixture being between about 1 to .1 and 1 to .01.

2. A liquid organic condensation reaction product having a fraction whose boiling point is above 175° C. and obtained by heating a mixture comprising pinene, an aqueous solution of formaldehyde and an acid catalyst, the mole ratio of said pinene to said formaldehyde in said mixture being between about 1 to 1 and 1 to 7, the mole ratio of said pinene to said acid catalyst in said mixture being between about 1 to .1 and 1 to .01.

MORTIMER T. HARVEY.